US008840000B1

(12) United States Patent
Simpson

(10) Patent No.: US 8,840,000 B1
(45) Date of Patent: *Sep. 23, 2014

(54) HEAVY DUTY LEVERAGED SPARE TIRE CARRIER

(71) Applicant: Donald L. Simpson, Fort Collins, CO (US)

(72) Inventor: Donald L. Simpson, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/257,932

(22) Filed: Apr. 21, 2014

Related U.S. Application Data

(63) Continuation-in-part of application No. 14/072,781, filed on Nov. 5, 2013, now Pat. No. 8,720,760.

(51) Int. Cl.
*B62D 43/02* (2006.01)

(52) U.S. Cl.
CPC ........................................ *B62D 43/02* (2013.01)
USPC ......... 224/509; 224/519; 224/532; 224/42.21

(58) Field of Classification Search
USPC ......... 224/282, 495, 502, 509, 519, 531, 532, 224/42.12, 42.13, 42.21, 42.24
See application file for complete search history.

(56) References Cited

U.S. PATENT DOCUMENTS

| | | | | |
|---|---|---|---|---|
| 3,822,814 A * | 7/1974 | Baldi | ............................ | 224/502 |
| 4,946,084 A * | 8/1990 | Britto | ........................... | 224/42.21 |
| 4,964,552 A * | 10/1990 | Terwilliger | ................ | 224/42.23 |
| 5,370,285 A * | 12/1994 | Steelman | ................... | 224/42.21 |
| 5,469,998 A * | 11/1995 | Van Dusen et al. | ........... | 224/506 |
| 6,659,318 B2 * | 12/2003 | Newbill | ........................ | 224/503 |
| 6,874,804 B2 * | 4/2005 | Reese et al. | .................... | 280/477 |
| 6,918,520 B2 * | 7/2005 | Skinner | ......................... | 224/282 |
| 7,249,927 B2 * | 7/2007 | Wooten et al. | ................ | 414/466 |

* cited by examiner

*Primary Examiner* — Justin Larson

(57) ABSTRACT

A heavy duty leveraged spare tire carrier utilizes a cross frame configured so a spare tire for a vehicle can be bolted thereto and mounted on a receiver-type hitch with a secondary receiver hitch mounted thereon. The carrier has an integral lever-actuated lifting and lowering apparatus to allow a single person the ability to remove and replace a spare tire on the carrier and/or to swing the carrier and spare tire out of the way so an engine or other compartment in the rear of the vehicle can still be accessed.

20 Claims, 8 Drawing Sheets

HEAVY DUTY LEVERAGED SPARE TIRE CARRIER

CROSS-REFERENCE TO RELATED APPLICATIONS

This application claims benefit of U.S. application Ser. No. 14/072,781 now U.S. Pat. No. 8,720,760, entitled HEAVY DUTY LEVERAGED SPARE TIRE CARRIER and filed on Nov. 5, 2013, which is specifically incorporated by reference herein for all that it discloses and teaches.

TECHNICAL FIELD

The present invention relates generally to the field of motor vehicles; more particularly, to large, recreational-vehicle-type motor vehicles; and more particularly still, to a heavy duty leveraged spare tire carrier that can be installed on a receiver hitch commonly found on recreational vehicles and is actuatable by a single person.

BACKGROUND

Motor vehicles have been in common usage for nearly a century. Shortly after the first, rather small, personal automobiles were rolling off assembly lines, larger trucks and related vehicles began to be produced in large numbers as well. Towable trailers equipped with living quarters soon followed, and it wasn't long before such trailers were placed on a truck chassis and the recreational vehicle ("RV") or motorhome was born. Today, such vehicles can be exceedingly large, requiring huge, heavy tires (in comparison to a standard automobile tire). Such tires, especially when affixed to a wheel and ready to be installed on the motorhome in place of a flat tire (such wheel and tire assemblies are ubiquitously referred to as spare tires), can weigh in excess of one hundred pounds and are quite unwieldy and difficult to handle. Perhaps for these reasons, many motorhomes and other large RVs often do not carry a spare tire. Thus, if the driver of such a vehicle is unfortunate enough to experience a flat tire, his or her only option is to call for assistance. Because recreational vehicles are often used to recreate in far-flung locations, assistance can be a long distance away, difficult to procure, and often very expensive, if available at all.

Most small motor vehicles (such as cars and light trucks) carry a spare tire either in the trunk, under the chassis, or otherwise attached to the automobile so that, in the case of a flat tire, the operator can remove the flat, install the spare tire, and drive the vehicle to a repair station for further assistance. Because many motorhome owners are familiar with this state of affairs when operating their smaller automobiles, they lament the fact that such a spare tire assembly is too big and heavy to be commonly installed in recreational vehicles and are often completely unprepared to deal with a flat tire if such occurs while they are operating their RV.

Since many manufacturers of RVs do not include a spare tire or even a mounting location for an owner to carry an after-market spare tire with them, there is currently a need for an RV spare tire carrier. However, as noted above, spare tires for RVs are exceedingly heavy and unwieldy, so spare tire carriers, as currently known in the art, are not built heavy enough to handle such spares and can not just be welded onto an RV because a single person could be crushed trying to remove a spare tire therefrom. Instead, what is needed is a heavy duty leveraged spare tire carrier than can be easily installed onto almost all RVs, is strong enough to carry the weight and bulk of an RV spare tire, and yet is configured in such a way as to allow a single person to load and unload the spare tire from the carrier without risking life and limb in the process.

Additionally, owners of other large trucks/vehicles, off-road vehicles, and others often wish to carry a spare tire (or a second spare tire) as well and so a device that can also meet the needs of these people can have additionally utility.

SUMMARY

One embodiment of the present invention comprises a heavy duty, cross or T-shaped frame configured so a spare tire for an RV or other vehicle can be attached thereto and mounted on a common receiver-type hitch with a secondary receiver hitch mounted thereon, and having an integral lever-actuated lifting and lowering apparatus to allow a single person the ability to remove and replace a spare tire on the carrier and/or to swing the carrier and spare tire out of the way so an engine or other compartment in the rear of the vehicle can still be accessed.

BRIEF DESCRIPTION OF THE DRAWINGS

The aforementioned and other features and objects of the present invention and the manner of attaining them will become more apparent and the invention itself will be best understood by reference to the following descriptions of a preferred embodiment and other embodiments taken in conjunction with the accompanying drawings, wherein.

DETAILED DESCRIPTION

Figure 1:
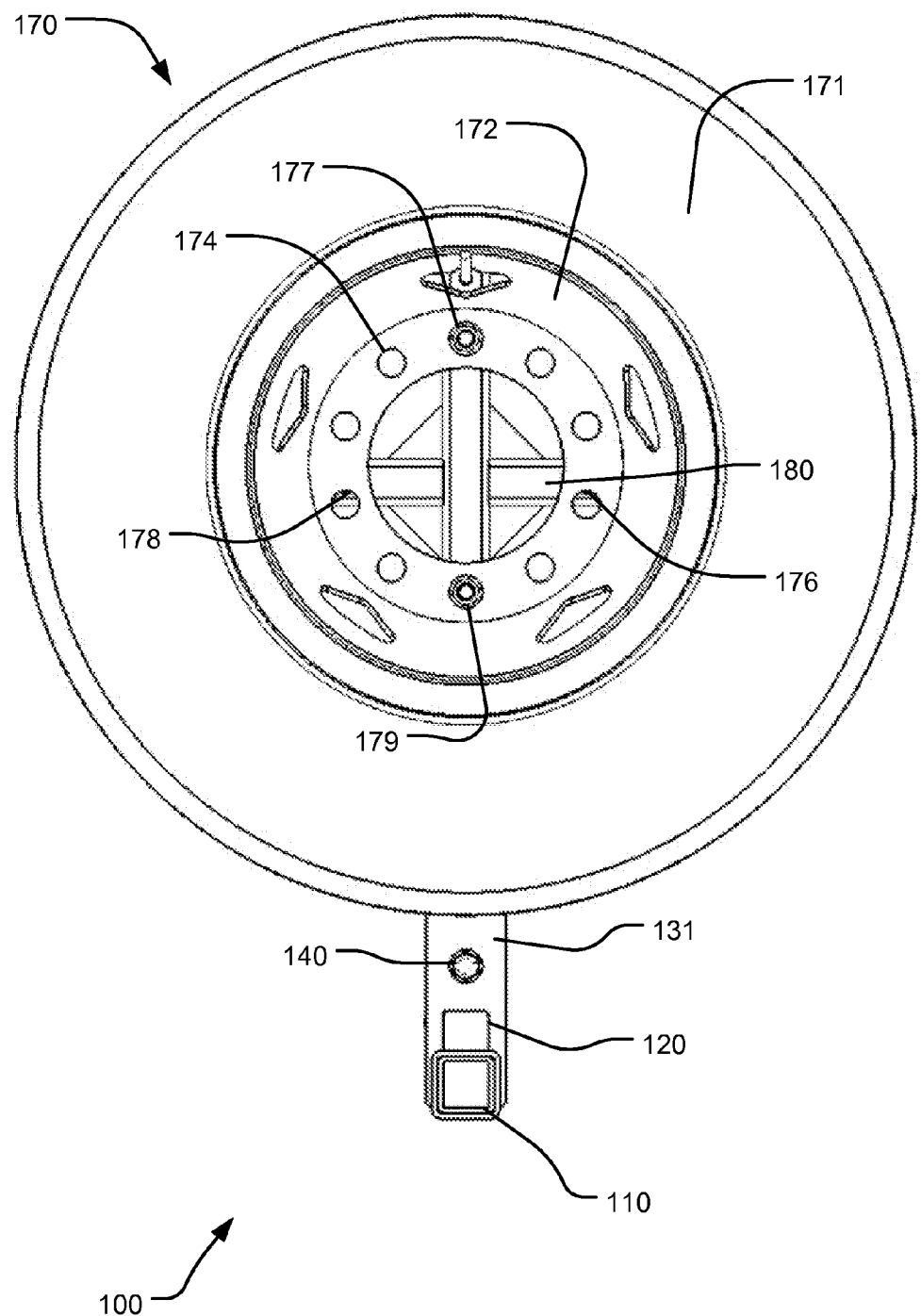
FIG. 1 illustrates a front elevation view of an exemplary embodiment of a heavy duty leveraged spare tire carrier with a spare tire attached.

Referring now to the drawings, FIG. 1 illustrates a front elevation view of an exemplary embodiment of a heavy duty leveraged spare tire carrier 100 with a spare tire 170 attached thereto. Note that in FIG. 1, the spare tire 170 includes both common components: the tire 171 already mounted onto the rim or wheel 172. Throughout this document, whenever a reference is made to a spare tire 170, it includes both a tire 171 and a wheel 172, unless otherwise described. The carrier 100 shown in FIG. 1 is mostly hidden behind the spare tire 170; reference to later drawing FIGS. is recommended.

The wheel 172 includes a plurality of mounting points 174 (often numbering ten on many RV wheels, as shown in FIG. 1, but other numbers are contemplated). In the embodiment illustrated in FIG. 1, there are two mounting bolts 177 and 179 illustrated utilizing two of the plurality of mounting points 174. In other embodiments, the number of mounting bolts may be higher or lower than that shown in FIG. 1. The mounting bolts 177 and 179 serve to removably affix the spare tire 170 to the carrier 100. By tightening down the fasteners on the mounting bolts 177 and 179 against the wheel rim 172, the spare tire 170 is adjustably drawn tightly against the carrier 100. A plurality of vibration reduction bumpers 176 and 178 engage the spare tire 170 as it presses towards the horizontal member 180. In FIG. 1, only two vibration reduction bumpers 176 and 178 are illustrated and only a small portion of each is visible; see FIG. 6, items 676 and 678 for a more complete depiction thereof. In another embodiment, a plurality of vibration reduction bumpers 176 and 178 are disposed on the vertical member 190 and the mounting bolts 177 and 179 are disposed on the horizontal member 180 (see FIG. 8 for an example).

The front hinge bracket 131 can be seen below the spare tire 170 in FIG. 1. The main body of the carrier 100 hinges on the hinge bolt 140 that runs through the front hinge bracket 131 and the rear hinge bracket (not shown in FIG. 1, see item 232 in FIG. 2). In order to mount the carrier 100 onto a vehicle, a draw bar 120 is affixed to the carrier 100. Because installation of a draw bar 120 into the receiver hitch opening on a vehicle blocks usage of said receiver hitch, a secondary receiver hitch 110 is installed on the carrier 100 itself to allow for use of other draw bars so that the vehicle can still tow trailers, etc., while the heavy duty leveraged spare tire carrier 100 is installed on the vehicle. Once the draw bar 120 is inserted into the receiver hitch on the vehicle, a hitch pin bolt (see FIG. 2, item 250) and ring pin (or other securing device) secure it therein. For additional security and/or strength, the hitch pin bolt can be threaded through the draw bar 120, either fully or partially.

Figure 2:
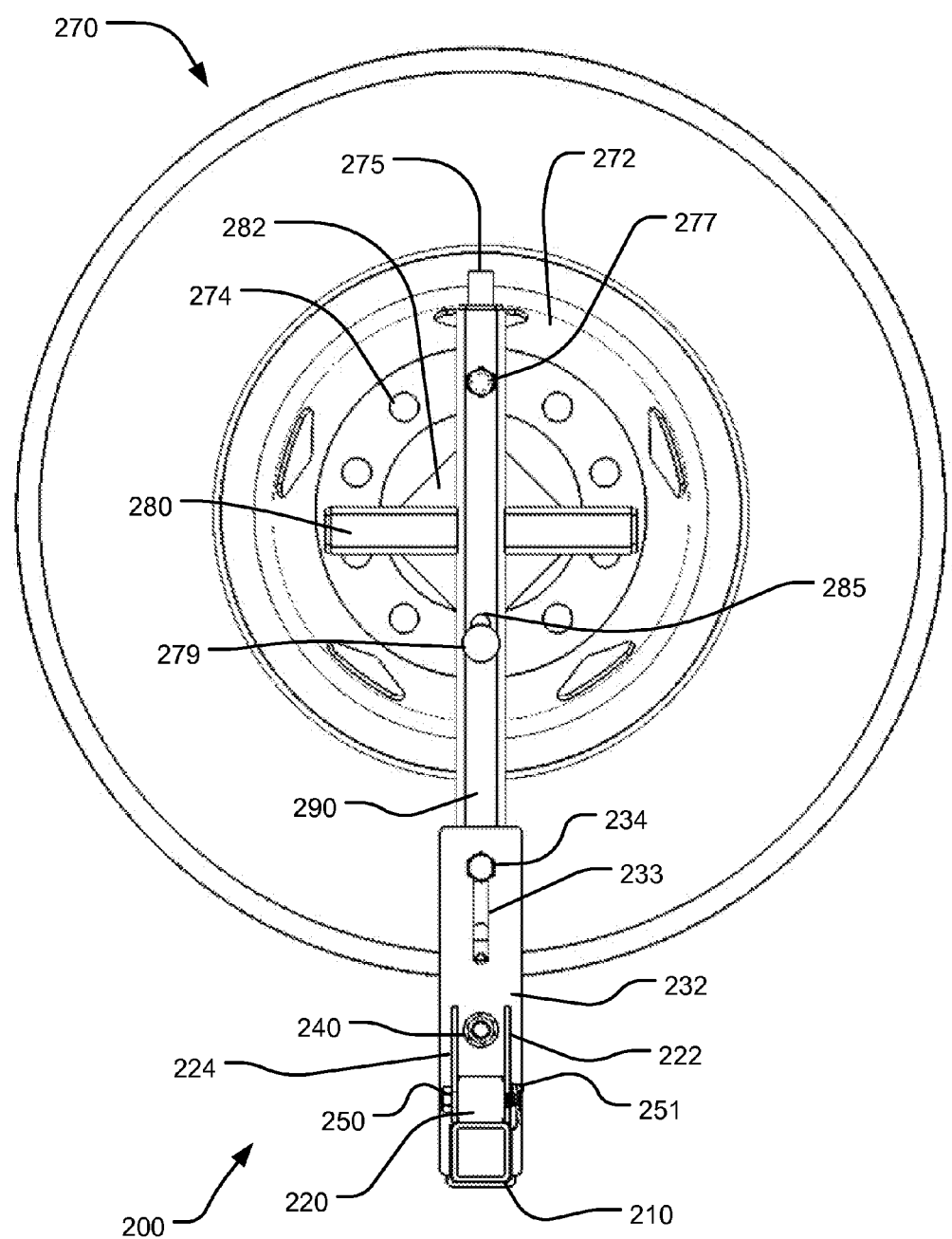
FIG. 2 illustrates a rear elevation view of an exemplary embodiment of a heavy duty leveraged spare tire carrier with a spare tire attached.

FIG. 2 illustrates a rear elevation view of an exemplary embodiment of a heavy duty leveraged spare tire carrier 200 with a spare tire 270 attached thereto. As in FIG. 1, the spare tire 270 includes both the tire 271 and the wheel 272 with the tire mounted thereon. Since FIG. 2 is a rear view, the carrier 200 can be more clearly seen than in FIG. 1.

The wheel 272 includes a plurality of mounting points 274. In the embodiment illustrated in FIG. 2, there are two mounting bolts 277 and 279 illustrated utilizing two of the plurality of mounting points 274. The mounting bolts 277 and 279 serve to removably affix the spare tire 270 to the carrier 200. The top mounting bolt 277 can be fixed in one location, and the bottom mounting bolt 279 can be slidably engaged in a first mounting slot 285 as illustrated in FIG. 2. This allows the bottom mounting bolt 279 to be repositionable upwards and downwards relative to the juncture. In other embodiments, the top mounting bolt 277 can be slidably engaged in a mounting slot and the bottom mounting bolt 279 can be fixed; alternatively, both or neither of said bolts 277 and 279 can be slidably engaged in a mounting slot. The first mounting slot 285 allows a mounting bolt 279 to be repositioned upwards and downwards in the vertical member 290 as needed to match up with the location of a bottom mounting point 274 on a spare tire 270. This flexibility allows the carrier 200 to be used with a wide array of spare tires 270 having two or more spare tire mounting points 274. In yet another embodiment, only one mounting bolt 277 or 279 is utilized and the other is replaced by an additional vibration reduction mount (see items 676 and 678 in FIG. 6); such a configuration can accommodate mounting a spare tire using only one mounting point.

In the embodiment illustrated in FIG. 2, the mounting slot 285 allows the bottom mounting bolt 279 to be repositioned upwards or downwards as needed. The mounting bolt 279 is shown as being a stove bolt or carriage bolt with a rounded head. Such a bolt should have an initial square-shaped shank to engage the mounting slot 285 in order to keep the mounting bolt 279 from turning when the nut or other tightening device is tightened down opposite the head of the bolt. In other embodiments, other types of mounting bolts 279 are contemplated.

The front hinge bracket is not shown in FIG. 2, see FIG. 1, item 131. The rear hinge bracket 232 is shown. Together, the two hinge brackets form a set of upright members affixed to the draw bar 220. The draw bar 220 can be solid ~2" stock steal or any other suitably strong material sized to fit into a receiver hitch (1.25, 2, 2.5, and 3 inch receiver hitches are common, but others are contemplated). Vertical support members 222 and 224 are affixed to the draw bar 220, the rear hinge bracket 232, and the secondary receiver hitch 210. These support members 222 and 224 strengthen the carrier 200 so that it can securely hold the spare tire 270 while withstanding the large forces exerted on the secondary receiver hitch 210 when a heavy load is attached to the vehicle via the carrier 200.

The main body of the carrier 200 can hinge or swing downwards from the upright position shown in FIG. 2 into a lowered position (see FIG. 7) so that a person can access the rear of the vehicle and/or can remove the spare tire 270 from the carrier 200. The hinge bolt 240 extends through the two upright hinge brackets 131 and 232, as well as the vertical member 290 of the main body of the carrier 200. A release pin 234 passes through at least one of the upright hinge brackets 131 and 232 and ensures that the vertical member 290 stays in an upright position until the release pin 234 is actuated, releasing the vertical member 290 from its position between the hinge brackets 131 and 232. Once released, the vertical member 290 can hinge on the hinge bolt 240 and be swung down to either side of the carrier 200. As illustrated in FIG. 2, the release pin 234 can have a release pin handle 233 that assists the user in actuating the release pin 234. In one embodiment, at least a portion of the release pin 234 is threaded and it threads into one or more of the upright hinge brackets 131 and 232 and/or the vertical member 290. A keeper pin or other securing device can then be inserted into the end of the release pin 234 to hold it in place on the far side of the upright hinge bracket 131. See later FIGS. for more detail on the hinge mechanism, release pin 234, etc.

The vertical member 290 can be manufactured from square steel tubing as shown in FIG. 2. In other embodiments, other metals or materials of sufficient strength can be utilized. In yet other embodiments, the vertical member 290 can be solid and it can have other cross-sectional shapes besides square. In FIG. 2, two of the mounting bolts 279 and 277 are attached to the vertical member 290, in other embodiments, additional or fewer mounting bolts can be attached to the horizontal member 280. The horizontal member 280 is attached to the vertical member 290 and generally extends perpendicular thereto, with approximately half of the horizontal member 280 extending to the left of the vertical member 290 and approximately half of the horizontal member 280 extending to the right. The two members 280 and 290 meet at the juncture of the cross. In other embodiments, a horizontal member 280 may be smaller or larger, may be positioned differently, or may be nonexistent.

The horizontal member 280 can be manufactured from square steel tubing as shown in FIG. 2, but like the vertical member 290, in other embodiments, the horizontal member 280 can be manufactured from other metals or materials of sufficient strength and it can be solid and/or have a cross-sectional shape besides a square (for example, rectangular, round, oval, hexagonal, or other shapes of tubing or solid material can be employed). In order to enhance the strength of the horizontal and vertical members 280 and 290 and the connection therebetween at the juncture, a plurality of angle supports 282 can be attached at each corner of the joint between the members 280 and 290. As shown in FIG. 2, the plurality of angle supports 282 can be triangular shaped metal pieces that are welded or otherwise connected to the horizontal member 280 and vertical member 290. In other embodiments, the number of angle supports 282 can be one, two, three, four, or none.

In order to mount the carrier 200 onto the vehicle, a draw bar 220 is affixed to the carrier 200. Because installation of a draw bar 220 into the receiver hitch opening on a vehicle blocks usage of said receiver hitch, a secondary receiver hitch 210 is affixed on the carrier 200 below the draw bar 220. The secondary receiver hitch 210 allows for use of other draw bars so that the vehicle can still tow trailers, etc. while the heavy duty leveraged spare tire carrier 200 is installed on the vehicle. Once the draw bar 220 is inserted into the receiver hitch on the vehicle, a hitch pin bolt 250 and hitch pin ring pin 251 (or other securing device such as a nut, lock-nut, etc.) secures it therein. In another embodiment, a secondary receiver hitch 210 is not utilized.

Figure 6:
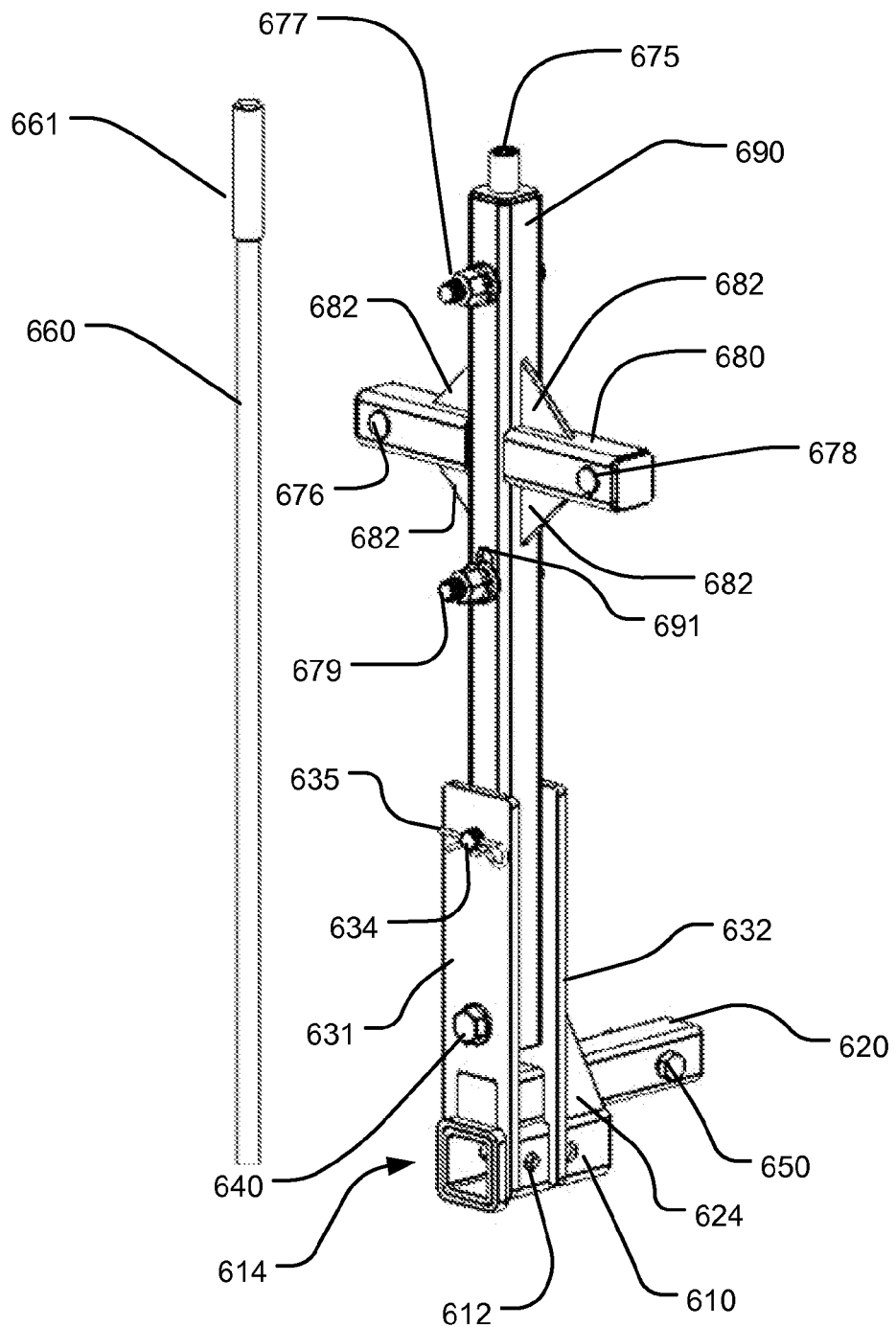
FIG. 6 illustrates a front perspective view of an exemplary embodiment of a heavy duty leveraged spare tire carrier without a spare tire mounted thereon and placed in the upright, travelling position.

An exemplary leverage handle 660 is not shown in FIG. 2, see FIG. 6. This implement can be installed in leverage attachment point 275 located near the top of the vertical member 290 when a person wishes to raise or lower the spare tire 270. The leverage handle 660 can be threaded into the leverage attachment point 275, can be simply slid into the leverage attachment point 275, or some other attachment mechanism can be employed so that the leverage handle 660 can act on the vertical member 290. Regardless of the means of attachment, the leverage handle 660 allows a single person to lower and raise the spare tire 270 by hinging the vertical member 290 on the hinge bolt 240. Because the leverage handle 660 extends the distance between the hinge bolt 240 and the location at which a user exerts force against the vertical member 290, significant leverage is gained; thereby allowing a single person to raise and lower a heavy spare tire 270 with ease. See later drawing FIGS. for additional descriptions of the leverage handle 660, hitch pin bolt 250 and hinging mechanism. In another embodiment the leverage attachment point is attached to the horizontal member such that the leverage handle can be attached to the horizontal member and can act upon the horizontal member in order to raise or lower the spare tire.

Figure 3:
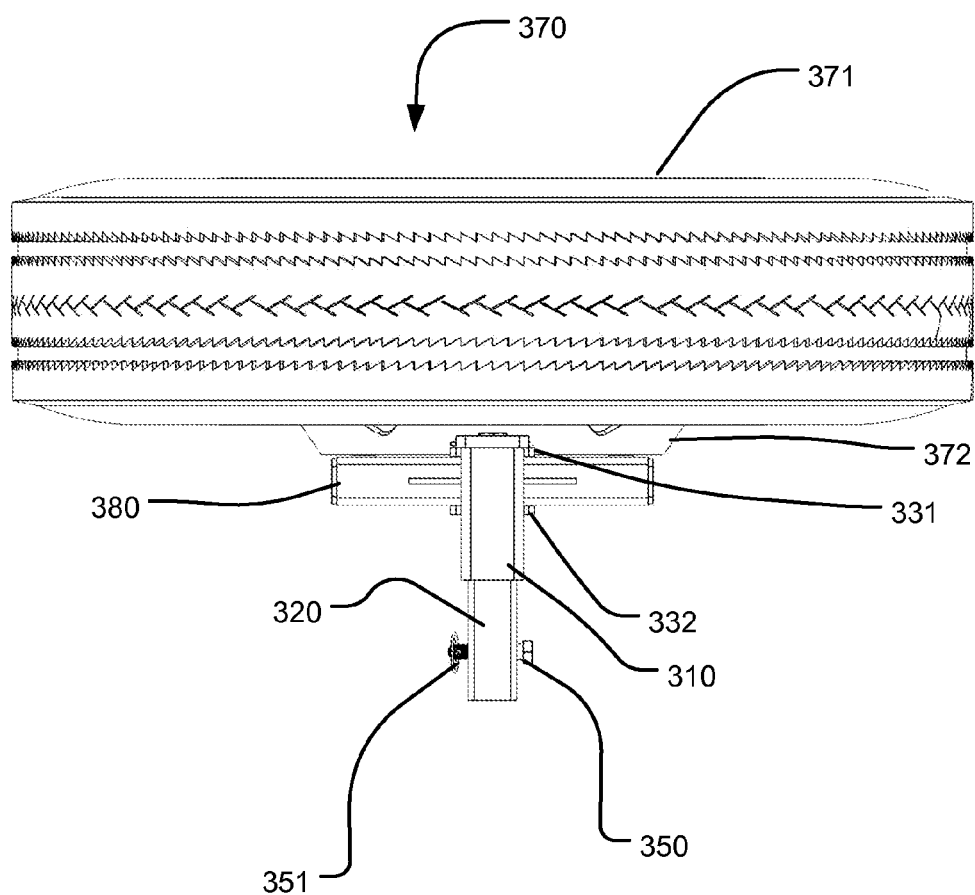
FIG. 3 illustrates a bottom plan view of an exemplary embodiment of a heavy duty leveraged spare tire carrier with a spare tire attached.

FIG. 3 illustrates a bottom plan view of an exemplary embodiment of a heavy duty leveraged spare tire carrier 300 with a spare tire 370 attached thereto. The relative position of the tire 371 and the wheel 372 can be seen more clearly from this viewing angle. The body of the secondary receiver hitch 310 affixed to the bottom of the carrier 300 can be clearly seen in FIG. 3. Above it, the draw bar 320 extends perpendicular to the horizontal member 380 and the hitch pin bolt 350 can be seen extending through the draw bar 320.

It should be apparent that when the draw bar 320 is inserted into the receiver hitch on a vehicle, the hitch pin bolt 350 would pass through the receiver hitch and through the draw bar 320, securing the draw bar 320 inside the receiver hitch. In FIG. 3, the hitch pin bolt 350 is shown as a hexagonal headed bolt with a ring pin 351 running through it. The ring pin 351 (or other securing device such as a lock nut, cotter pin, etc.) is adapted to ensure that the bolt 350 can not inadvertently slide back through the draw bar 320. In other embodiments, other types of hitch pin bolts 350 as known in the art can be employed (e.g., locking hitch pins, L handled pins, T handled pins, etc.). The bottom portions of the hinge brackets 331 and 332 can be seen in FIG. 3. See later FIGS. for more detail of the hinge brackets 331 and 332.

Figure 4:
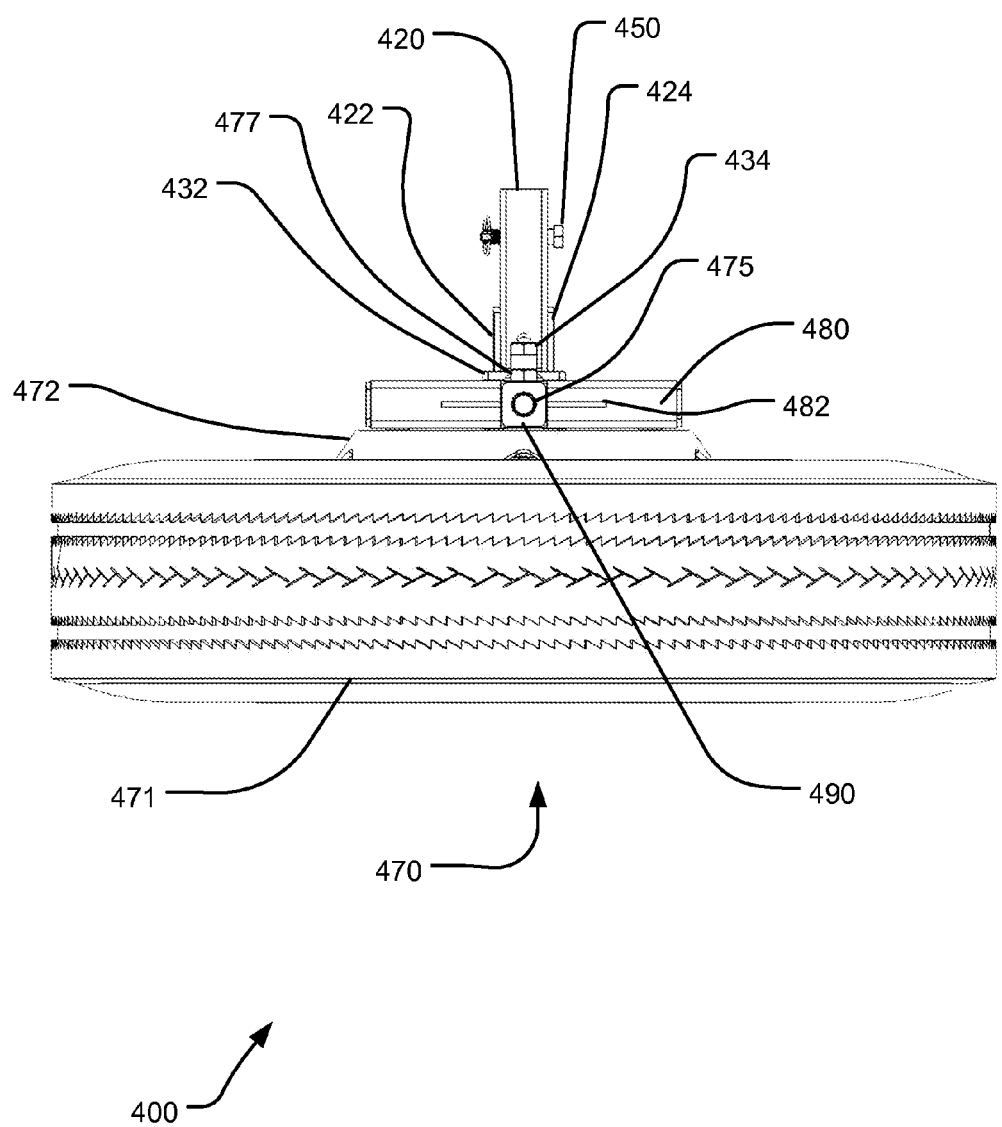
FIG. 4 illustrates a top plan view of an exemplary embodiment of a heavy duty leveraged spare tire carrier with a spare tire attached.

FIG. 4 illustrates a top plan view of an exemplary embodiment of a heavy duty leveraged spare tire carrier 400 with a spare tire 470 attached. In this view, the leverage attachment point 475 can be seen extending from the top of the vertical member 490. The top mounting bolt 477 can be seen, it extends through the vertical member 490 and attaches the wheel 472 to the member 490. The angle supports 482 are visible running between the vertical member 490 and the horizontal member 480.

Below the top mounting bolt 477, the rear hinge bracket 432 can be seen as can the release pin 434. The vertical support members 422 and 424 are illustrated. As discussed above, the vertical support members 422 and 424 attach to the vertical member 490, the draw bar 420 and the secondary receiver hitch (not shown in FIG. 4, see FIG. 3, item 310). An exemplary hitch pin bolt 450 is also illustrated.

Figure 5:
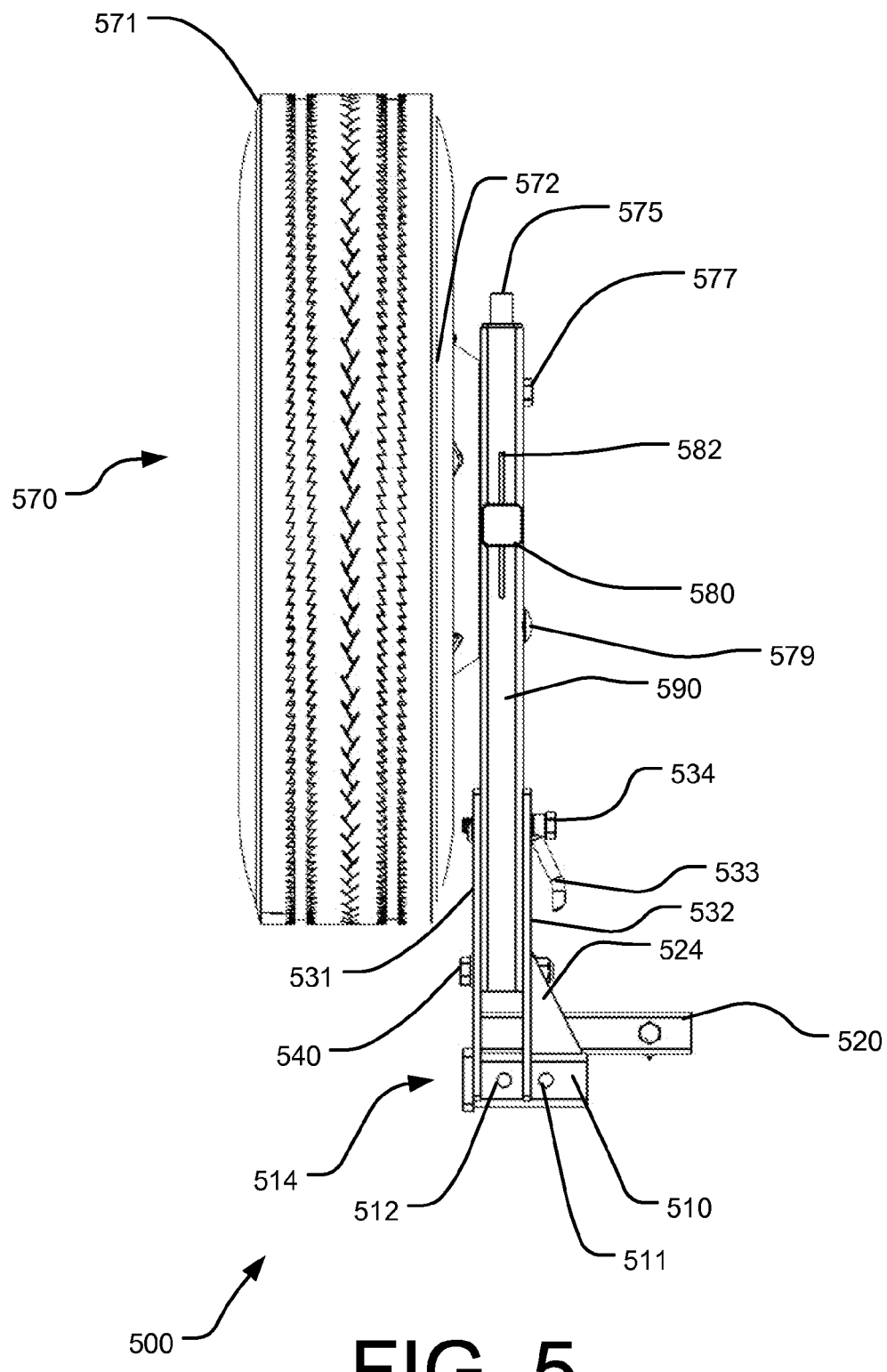
FIG. 5 illustrates a left side elevation view of an exemplary embodiment of a heavy duty leveraged spare tire carrier with a spare tire attached.

FIG. 5 illustrates a left side elevation view of an exemplary embodiment of a heavy duty leveraged spare tire carrier 500 with a spare tire 570 (including tire 571 and wheel 572) attached. When viewed from the side, the placement of the vertical member 590 between the front hinge plate 531 and the rear hinge plate 532 can be clearly seen.

To release the vertical member 590 and allow it to swing down, the release pin 534 must be actuated. To accomplish this, first the securing pin (see FIG. 6, keeper pin 635) must be removed. In the embodiment shown in FIG. 5, the release pin handle 533 can then be grasped and used to turn the release pin out of the vertical member 590. Once free, the vertical member 590 can then hinge on the hinge bolt 540, causing the spare tire 570 to swing downwards from its upright position. In one embodiment, the release pin 534 is threaded so it can be screwed into or out of the assembly in order to secure or release the vertical member 590 from the front and rear hinge plates 531 and 532. In other embodiments, the release pin 534 can be secured in other ways (such as a locking cam, a bearing lock, etc.).

The positions of the horizontal member 580 and angle supports 582 relative to the vertical member 590 are illustrated in FIG. 5 as are the mounting bolts 577 and 579. The leverage attachment point 575 is illustrated near the top of the vertical member 590

The side view of FIG. 5 provides a clear presentation of the vertical support member 524 and it should be obvious that the vertical support member 524 connects to all of the rear hinge plate 532, the draw bar 520, and the secondary receiver hitch 510, thereby enhancing the structural integrity and strength of the assembly. In other embodiments, the vertical support members can be larger, smaller, or nonexistent in lighter applications. FIG. 5 also shows the front and rear hinge brackets 531 and 532 attaching to both the draw bar 520 and the secondary receiver hitch 510, providing additional strength and support such that a trailer can be connected to the secondary receiver hitch 510 and be fully supported by the carrier 500.

The secondary receiver hitch 510 is illustrated in FIG. 5 with a first hitch pin hole 512, a second hitch pin hole 511, and a receiver hitch opening 514, useful features in a receiver hitch assembly. In order to use this assembly, a second draw bar would be inserted into the mouth of the receiver hitch opening 514 and a hitch pin would then be inserted through one of the hitch pin holes 511 or 512 and through the second draw bar, securing the second draw bar within the secondary receiver hitch 510. For additional strength and/or safety, both hitch pin holes could have hitch pins therethrough.

FIG. 6 illustrates a front perspective view of an exemplary embodiment of a heavy duty leveraged spare tire carrier 600 without a spare tire mounted thereon and placed in the upright, travelling position. With the removal of the spare tire from the carrier 600, most of the components can be seen more clearly.

In the embodiment illustrated in FIG. 6, there are two mounting bolts 677 and 679 that can be used to attach the wheel of the spare tire to the carrier 600. In other embodiments, the number of mounting bolts 677 and 679 can vary from the two shown in FIG. 6. The mounting bolts are attached to the vertical member 690. This distributes the weight of the spare tire across the member, ensuring that the carrier 600 can securely hold the large and unwieldy weight of spare tire assembly. The perspective view of FIG. 6 clearly illustrates the relative positions of the vertical member 690 and the horizontal member 680 as well as the angle supports 682 that enhance the strength of the connections therebetween. If the angle supports 682 are not needed in other embodiments, the carrier 600 can be constructed without them. Similarly, the horizontal member 678 could be deemed superfluous in some applications and left off.

Figure 7:
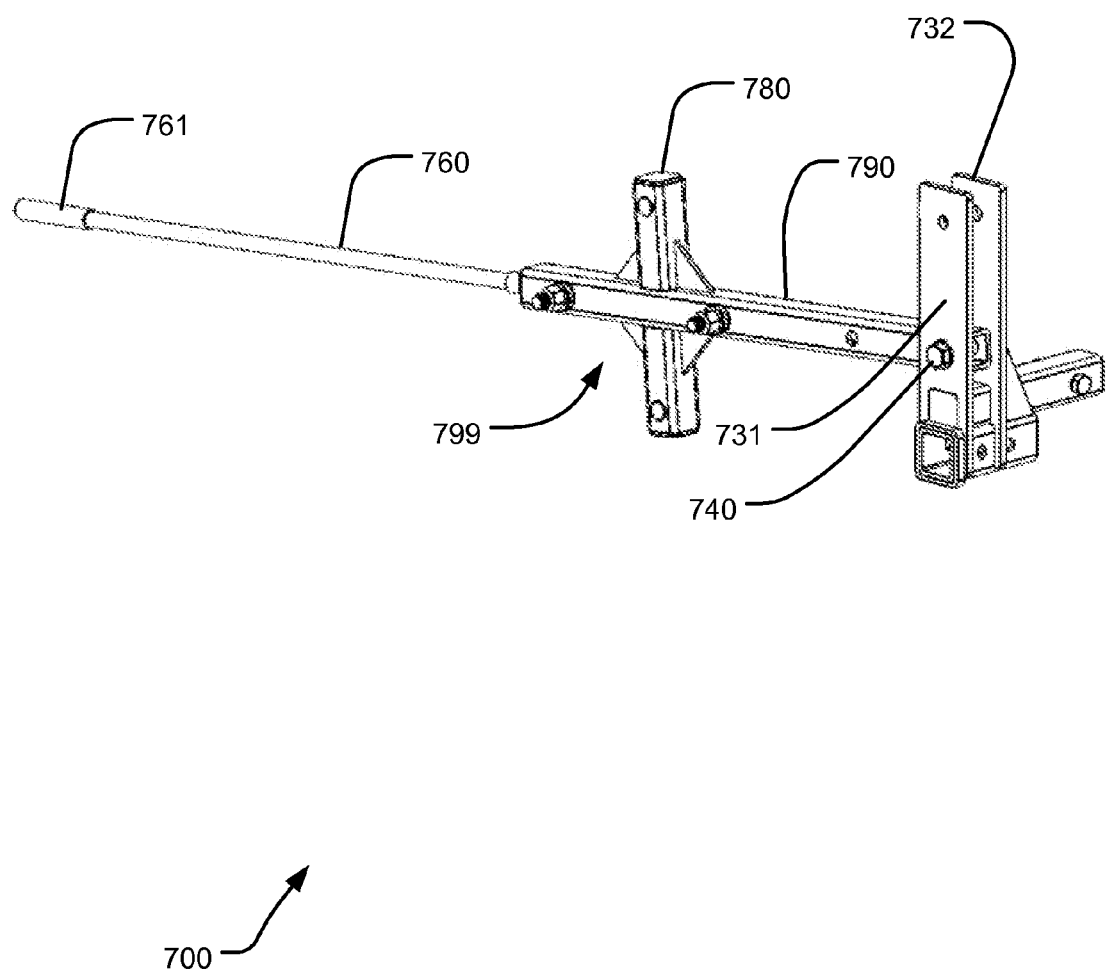
FIG. 7 illustrates a front perspective view of an exemplary embodiment of a heavy duty leveraged spare tire carrier without a spare tire mounted thereon and lowered into a horizontal, non-travelling position.

Near the top of the vertical member 690 is the leverage attachment point 675 to which the leverage handle 660 attaches. The leverage handle 660 is illustrated in FIG. 6 as having a grip 661 to ensure that a user has a secure means of gripping the leverage handle 660 when using it to lower or raise the carrier 600; in other embodiments, no grip 661 is present. The leverage handle 660 is configured to removably attach to a leverage attachment point 675 on the carrier, the leverage attachment point 675 is configured to accept removable attachment of the leverage handle thereto, and the leverage handle 660 is adapted to decrease the force required to raise or lower the spare tire between its lowered position (as illustrated in FIG. 7) and its vertical stored position (see FIG. 6).

The front hinge bracket 631 and rear hinge bracket 632 are shown in FIG. 6. Together, the two hinge brackets form a set of upright members affixed to the draw bar 620 and the secondary receiver hitch 610. Vertical support members 422 (not visible in FIG. 6, see item 422 in FIG. 4) and 624 are affixed to the draw bar 620, the rear hinge bracket 632, and the secondary receiver hitch 610. These support members 422 and 624 strengthen the carrier 600 so that it can securely hold the spare tire while withstanding the large forces exerted on the secondary receiver hitch 610 when a heavy load is attached to the vehicle via the carrier 600.

The main body of the carrier 600 can hinge or swing downwards from the upright position shown in FIG. 6 into a lowered position (see FIG. 7) so that a person can access the rear of the vehicle and/or can remove the spare tire from the carrier 600. A flat tire from the vehicle can then be placed on the carrier 600 or the spare tire can be replaced thereon. The hinge bolt 640 extends through the two upright hinge brackets 631 and 632, as well as the vertical member 690 of the main body of the carrier 600. A release pin 634 is attached to at least one of the upright hinge brackets 631 and 632 (in the embodiment shown in FIG. 6, the release pin 634 is shown as penetrating completely through both brackets) and ensures that the vertical member 690 stays in an upright position until the release pin 634 is actuated, thereby releasing the vertical member 690 from its vertical position between the hinge brackets 631 and 632. Once released, the vertical member 690 can hinge on the hinge bolt 640 and be swung down to either side of the carrier 600. In order to actuate the release pin 634 a security pin 635 must first be removed from the distal end of the release pin 634. In other embodiments, other types of release pins 634 are contemplated (for example, a spring actuated release pin 634 could be employed wherein the spring keeps the pin 634 snuggly seated through the rear hinge bracket 632 and into contact with the vertical member 690 until the release pin 634 is pulled sharply away from the rear hinge bracket 632, drawing the release pin 634 out of contact with the vertical member 690 so the vertical member 690 can swing down. When the release pin 634 is released, the spring brings the release pin 634 back through the rear hinge bracket 632 and into engagement with the vertical member 690 (assuming it was swung back up and into position), securing it in its upright position.

The vertical member 690 can be manufactured from square steel tubing as shown in FIG. 6. In other embodiments, other metals or materials of sufficient strength can be utilized. In yet other embodiments, the vertical member 690 can be solid and it can have other cross-sectional shapes besides square. In FIG. 6, two of the mounting bolts 679 and 677 are attached to the vertical member 690. Nuts with nylon inserts can lock-onto the mounting bolts 677 and 679 in order to secure the rim of the spare tire to the carrier 600. This is accomplished by placing one or more washers (which can include protective nylon washers) onto the mounting bolts after they extend through the vertical member 690, followed by the rim, and then place one or more additional washers over each bolt followed by a securing nut, lock-nut, or other similar device that screws down tight onto the bolt assembly and secures the spare tire onto the mounting bolts 677 and 679.

In the embodiment illustrated in FIG. 6, there are two mounting bolts 677 and 679 that can engage two of the plurality of mounting points on a spare tire (see FIG. 2, mounting points 274, for example). The mounting bolts 677 and 679 serve to removably affix a spare tire to the carrier 600. The top mounting bolt 677 can be fixed in one location, and the bottom mounting bolt 679 can be slidably engaged in a second mounting slot 691 (similar to the first mounting slot 285 shown in FIG. 2). In other embodiments, the top mounting bolt 677 can be slidably engaged in a mounting slot and the bottom mounting bolt 679 can be fixed; alternatively, both or neither of said bolts 677 and 679 can be slidably engaged in a mounting slot. The second mounting slot 691 allows a mounting bolt 679 to be positioned up and down in the vertical member 690 as needed to match up with the location of a bottom mounting point on a spare tire. This flexibility allows the carrier 600 to be used with a wide array of spare tires having two or more spare tire mounting points.

The horizontal member 680 is attached to the vertical member 690 and generally extends perpendicular thereto, with approximately half of the horizontal member 680 extending to the left of the vertical member 690 and approximately half of the horizontal member 680 extending to the right. The horizontal member 680 can be manufactured from square steel tubing as shown in FIG. 6, but like the vertical member 690, in other embodiments, the horizontal member 680 can be manufactured from other metals or materials of sufficient strength and it can be solid and/or have a cross-sectional shape besides a square (for example, rectangular, round, oval, hexagonal, or other shapes of tubing or solid material can be employed).

A plurality of vibration reduction bumpers 676 and 678 can be mounted on the carrier 600. The bumpers 676 and 678 can be formed from flexible material(s) that serve to hold the spare tire securely in place once it has been tightened down onto the carrier 600. For example, the bumpers 676 and 678 can be formed from a somewhat stiff rubber material and can be positioned such that they press against the rim of the spare tire as it is tightened down onto the mounting bolts 677 and 679. Further tightening then causes the bumpers to compress and deform, and thus, securely hold the spare tire in place via a friction fit. Any road vibration traveling through the vehicle, to which the carrier 600 is mounted, can be absorbed by the plurality of vibration reduction bumpers 676 and 678, thereby helping to keep the spare tire mounted firmly in place.

In order to enhance the strength of the horizontal and vertical members 680 and 690 and the connection therebetween, a plurality of angle supports 682 can be attached at each corner of the joint between the members 680 and 690. As shown in FIG. 6, the plurality of angle supports 682 can be triangular shaped metal pieces that are welded or otherwise connected to the horizontal member 680 and vertical member 690. In other embodiments, the number of angle supports 682 can be none, one, two, three, four, or more.

In order to mount the carrier 600 onto a vehicle, a draw bar 620 is affixed to the carrier 600. Because installation of a draw bar 620 into the receiver hitch opening on a vehicle blocks usage of said receiver hitch, a secondary receiver hitch 610 is affixed on the carrier 600 below the draw bar 620. The secondary receiver hitch 610 allows for use of other draw bars so that the vehicle can still tow trailers, etc. while the heavy duty leveraged spare tire carrier 600 is installed on the vehicle. Once the draw bar 620 is inserted into the receiver hitch on the vehicle, a hitch pin bolt 650 and nut (or other securing device) secures it therein.

An exemplary leverage handle 660 is shown in FIG. 6. This implement is installed in leverage attachment point 675 located near the top of the vertical member 690 when a person wishes to raise or lower the spare tire 670. The leverage handle 660 can be threaded into the leverage attachment point 675, can be simply slid into (or over) the leverage attachment point 675, or some other attachment mechanism can be employed so that the leverage handle 660 can act on the vertical member 690. Regardless of the means of attachment, the leverage handle 660 allows a single person to lower and raise the spare tire 670 by hinging the vertical member 690 on the hinge bolt 640. Because the leverage handle 660 extends the distance between the hinge bolt 640 and the location at which a user exerts force against the vertical member 690, significant leverage is gained; thereby allowing a single person to raise and lower the extremely heavy spare tire 670 with ease.

In the embodiment in FIG. 6, the leverage handle 660 appears to have an outer perimeter that is circular-shaped; in other embodiments, the leverage handle 660 can have an outer perimeter that is shaped like a square, triangle, oval, or any other shape. The leverage attachment point 675 should be shaped to match so that the leverage handle 660 can be inserted therein or otherwise attached thereto; for example, it could be placed over the leverage attachment point 675.

The secondary receiver hitch 610 is illustrated in FIG. 6 with a hitch pin hole 612 and a receiver hitch opening 614, important features in a receiver hitch assembly. In order to use this assembly, a second draw bar would be inserted into the mouth of the receiver hitch opening 614 and a hitch pin would then be inserted through the hitch pin hole 612 and through the second draw bar, securing the second draw bar within the secondary receiver hitch 610.

FIG. 7 illustrates a front perspective view of an exemplary embodiment of a heavy duty leveraged spare tire carrier 700 without a spare tire mounted thereon and lowered into a horizontal, non-travelling position. The leverage handle 760 is shown in its active position, attached to the vertical member 790. By grasping the grip 761, a user can take advantage of the leverage gaining benefits of moving the point of application of force further out from the fulcrum (here, the fulcrum is the hinge bolt 740). The amount of force required to raise or lower the spare tire is much reduced when that force is applied to the grip 761 of the leverage handle 760 versus if it was applied directly to the vertical member 790 itself.

The front and rear hinge brackets 731 and 732 are illustrated in FIG. 7 with the release pin removed, allowing the vertical member 790 to swing downwards on the hinge bolt 740. Note that the carrier 700 is designed such that the vertical member 790 can swing either left or right in the embodiment shown in FIG. 7. In other embodiments, it may be useful to limit the direction of swing to one or the other. Also shown in FIG. 7 is the juncture 799 of the vertical member 790 and the horizontal member 780.

Depending on the height of the vehicle's receiver hitch, once the vertical member 790 is swung downwards, a spare tire attached to the vertical member 790 will now be resting on the ground. The spare can then be detached from the carrier 700 and rolled away without the user having to lift and/or wrangle the large and weighty tire. The vehicle's flat tire can then be rolled to the carrier, attached thereto, and the vertical member 790 and flat tire can then be swung back up and into place using the leverage handle 760.

Figure 8:
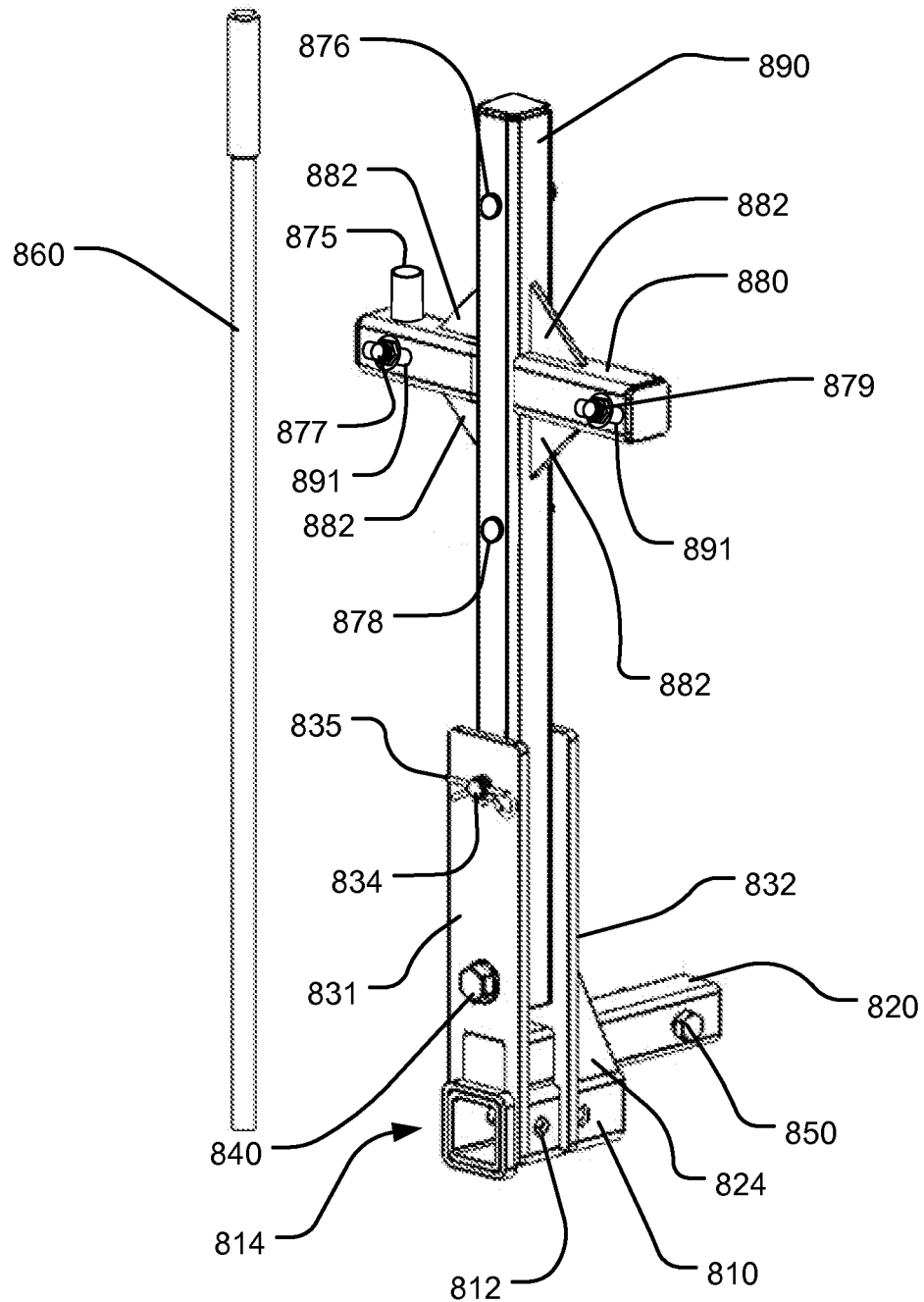
FIG. 8 illustrates a front perspective view of another exemplary embodiment of a heavy duty leveraged spare tire carrier without a spare tire mounted thereon and placed in the upright, travelling position.

FIG. 8 illustrates a front perspective view of another exemplary embodiment of a heavy duty leveraged spare tire carrier 800 without a spare tire mounted thereon and placed in the upright, travelling position. With the removal of the spare tire from the carrier 800, most of the components can be seen more clearly.

In the embodiment illustrated in FIG. 8, there are two mounting bolts 877 and 879 on the horizontal member 880 that can be used to attach the wheel of the spare tire to the carrier 800. In other embodiments, the number of mounting bolts 877 and 879 can vary from the two shown in FIG. 8. The mounting bolts are attached to the horizontal member 880. This distributes the weight of the spare tire across the member, ensuring that the carrier 800 can securely hold the large and unwieldy weight of spare tire assembly. The perspective view of FIG. 8 clearly illustrates the relative positions of the vertical member 890 and the horizontal member 880 as well as the angle supports 882 that enhance the strength of the connections therebetween. If the angle supports 882 are not needed in other embodiments, the carrier 800 can be constructed without them. Similarly, the horizontal member 878 could be deemed superfluous in some applications and left off.

Mounted on the horizontal member 880 is the leverage attachment point 875 to which the leverage handle 860 attaches. This is one of many possible alternative mounting locations versus that shown in the embodiment of FIG. 6. The leverage handle 860 is illustrated in FIG. 8 as having a grip 861 to ensure that a user has a secure means of gripping the leverage handle 860 when using it to lower or raise the carrier 800; in other embodiments, no grip 861 is present. The leverage handle 860 is configured to removably attach to a leverage attachment point 875 on the carrier, the leverage attachment point 875 is configured to accept removable attachment of the leverage handle thereto, and the leverage handle 860 is adapted to decrease the force required to raise or lower the spare tire between its lowered position (as illustrated in FIG. 7) and its vertical stored position shown here.

The front hinge bracket 831 and rear hinge bracket 832 are shown in FIG. 8. Together, the two hinge brackets form a set of upright members affixed to the draw bar 820 and the secondary receiver hitch 810. Vertical support members 422 (not visible in FIG. 8, see item 422 in FIG. 4) and 824 are affixed to the draw bar 820, the rear hinge bracket 832, and the secondary receiver hitch 810. These support members 422 and 824 strengthen the carrier 800 so that it can securely hold the spare tire while withstanding the large forces exerted on the secondary receiver hitch 810 when a heavy load is attached to the vehicle via the carrier 800.

The main body of the carrier 800 can hinge or swing downwards from the upright position shown in FIG. 8 into a lowered position (see FIG. 7) so that a person can access the rear of the vehicle and/or can remove the spare tire from the carrier 800. A flat tire from the vehicle can then be placed on the carrier 800 or the spare tire can be replaced thereon. The hinge bolt 840 extends through the two upright hinge brackets 831 and 832, as well as the vertical member 890 of the main body of the carrier 800. A release pin 834 is attached to at least one of the upright hinge brackets 831 and 832 (in the embodiment shown in FIG. 8, the release pin 834 is shown as penetrating completely through both brackets) and ensures that the vertical member 890 stays in an upright position until the release pin 834 is actuated, thereby releasing the vertical member 890 from its vertical position between the hinge brackets 831 and 832. Once released, the vertical member 890 can hinge on the hinge bolt 840 and be swung down to either side of the carrier 800. In order to actuate the release pin 834 a security pin 835 must first be removed from the distal end of the release pin 834. In other embodiments, other types of release pins 834 are contemplated (for example, a spring actuated release pin 834 could be employed wherein the spring keeps the pin 834 snuggly seated through the rear hinge bracket 832 and into contact with the vertical member 890 until the release pin 834 is pulled sharply away from the rear hinge bracket 832, drawing the release pin 834 out of contact with the vertical member 890 so the vertical member 890 can swing down. When the release pin 834 is released, the spring brings the release pin 834 back through the rear hinge bracket 832 and into engagement with the vertical member 890 (assuming it was swung back up and into position), securing it in its upright position.

The vertical member 890 can be manufactured from square steel tubing as shown in FIG. 8. In other embodiments, other metals or materials of sufficient strength can be utilized. In yet other embodiments, the vertical member 890 can be solid and it can have other cross-sectional shapes besides square.

The horizontal member 880 is attached to the vertical member 890 and generally extends perpendicular thereto, with approximately half of the horizontal member 880 extending to the left of the vertical member 890 and approximately half of the horizontal member 880 extending to the right. The horizontal member 880 can be manufactured from square steel tubing as shown in FIG. 8, but like the vertical member 890, in other embodiments, the horizontal member 880 can be manufactured from other metals or materials of sufficient strength and it can be solid and/or have a cross-sectional shape besides a square (for example, rectangular, round, oval, hexagonal, or other shapes of tubing or solid material can be employed).

In FIG. 8, two of the mounting bolts 879 and 877 are attached to the horizontal member 880. Nuts with nylon inserts can lock-onto the mounting bolts 877 and 879 in order to secure the rim of the spare tire to the carrier 800. This is accomplished by placing one or more washers (which can include protective nylon washers) onto the mounting bolts after they extend through the horizontal member 880, followed by the rim, and then place one or more additional washers over each bolt followed by a securing nut, lock-nut, or other similar device that screws down tight onto the bolt assembly and secures the spare tire onto the mounting bolts 877 and 879.

In the embodiment illustrated in FIG. 8, there are two mounting bolts 877 and 879 that can engage two of the plurality of mounting points on a spare tire (see FIG. 2, mounting points 274, for example). The mounting bolts 877 and 879 serve to removably affix a spare tire to the carrier 800. The left mounting bolt 877 can be fixed in one location, or either or both can be slidably engaged in mounting slots 891 (similar to the first mounting slot 285 shown in FIG. 2). In other embodiments, the left mounting bolt 877 can be slidably engaged in a mounting slot and the right mounting bolt 879 can be fixed; alternatively, both or neither of said bolts 877 and 879 can be slidably engaged in a mounting slot. The second mounting slots 891 allow a mounting bolt 877 or 879 to be positioned left and right horizontally in the horizontal member 880 as needed to match up with the location of mounting points on a spare tire. This flexibility allows the carrier 800 to be used with a wide array of spare tires having two or more spare tire mounting points.

A plurality of vibration reduction bumpers 876 and 878 can be mounted on the carrier 800. The bumpers 876 and 878 can be formed from flexible material(s) that serve to hold the spare tire securely in place once it has been tightened down onto the carrier 800. For example, the bumpers 876 and 878 can be formed from a somewhat stiff rubber material and can be positioned such that they press against the rim of the spare tire as it is tightened down onto the mounting bolts 877 and 879. Further tightening then causes the bumpers to compress and deform, and thus, securely hold the spare tire in place via a friction fit. Any road vibration traveling through the vehicle, to which the carrier 800 is mounted, can be absorbed by the plurality of vibration reduction bumpers 876 and 878, thereby helping to keep the spare tire mounted firmly in place. As illustrated in FIG. 8, the plurality of vibration reduction bumpers 876 and 878 can be mounted on the vertical member 890. In another embodiment (for example, see FIG. 6), they can be mounted on the horizontal member 880. In yet other embodiments, one or more can be mounted on each of the horizontal and vertical members 880 and 890.

In order to enhance the strength of the horizontal and vertical members 880 and 890 and the connection therebetween, a plurality of angle supports 882 can be attached at each corner of the juncture between the members 880 and 890. As shown in FIG. 8, the plurality of angle supports 882 can be triangular shaped metal pieces that are welded or otherwise connected to the horizontal member 880 and vertical member 890. In other embodiments, the number of angle supports 882 can be none, one, two, three, four, or more.

In order to mount the carrier 800 onto a vehicle, a draw bar 820 is affixed to the carrier 800. Because installation of a draw bar 820 into the receiver hitch opening on a vehicle blocks usage of said receiver hitch, a secondary receiver hitch 810 is affixed on the carrier 800 below the draw bar 820. The secondary receiver hitch 810 allows for use of other draw bars so that the vehicle can still tow trailers, etc. while the heavy duty leveraged spare tire carrier 800 is installed on the vehicle. Once the draw bar 820 is inserted into the receiver hitch on the vehicle, a hitch pin bolt 850 and nut (or other securing device) secures it therein.

An exemplary leverage handle 860 is shown in FIG. 8. This implement is installed in leverage attachment point 875 when a person wishes to raise or lower the spare tire 870. The leverage handle 860 can be threaded into the leverage attachment point 875, can be simply slid into (or over) the leverage attachment point 875, or some other attachment mechanism can be employed so that the leverage handle 860 can act on the horizontal member 880. Regardless of the means of attachment, the leverage handle 860 allows a single person to lower and raise the spare tire 870 by hinging the vertical member 890 on the hinge bolt 840. Because the leverage handle 860 extends the distance between the hinge bolt 840 and the location at which a user exerts force against the spare tire, significant leverage is gained; thereby allowing a single person to raise and lower the extremely heavy spare tire 870 with ease.

In the embodiment in FIG. 8, the leverage handle 860 appears to have an outer perimeter that is circular-shaped; in other embodiments, the leverage handle 860 can have an outer perimeter that is shaped like a square, triangle, oval, or any other shape. The leverage attachment point 875 should be shaped to match so that the leverage handle 860 can be inserted therein or otherwise attached thereto; for example, it could be placed over the leverage attachment point 875.

The secondary receiver hitch 810 is illustrated in FIG. 8 with a hitch pin hole 812 and a receiver hitch opening 814, important features in a receiver hitch assembly. In order to use this assembly, a second draw bar would be inserted into the mouth of the receiver hitch opening 814 and a hitch pin would then be inserted through the hitch pin hole 812 and through the second draw bar, securing the second draw bar within the secondary receiver hitch 810.

While particular embodiments of the invention have been described and disclosed in the present application, it should be understood that any number of permutations, modifications, or embodiments may be made without departing from the spirit and scope of this invention. Accordingly, it is not the intention of this application to limit this invention in any way except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above "Detailed Description" section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

In light of the above "Detailed Description," the Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The above specification, examples and data provide a description of the structure and use of exemplary implementations of the described articles of manufacture and methods. It is important to note that many implementations can be made without departing from the spirit and scope of the invention.

What is claimed is:

1. A heavy duty leveraged spare tire carrier, comprising:
    a vertical member having a proximal half and a distal half and a horizontal member attached to the distal half of the vertical member at a juncture, with at least a portion of the horizontal member extending to each side of the vertical member such that together the vertical member and the horizontal member form a cross;
    a first hinge bracket and a second hinge bracket, the hinge brackets configured in parallel and placed vertically and in proximity to each other with a portion of the proximal half of the vertical member positioned therebetween;
    a hinge bolt extending through the first and second hinge brackets and through the proximal half of the vertical member placed therebetween, the hinge bolt running generally horizontally therethrough and configured so as to provide a hinge point for the vertical member so that the distal half of the vertical member can swing out from between the first and second hinge brackets while the proximal half remains attached to and between the hinge brackets;
    a plurality of mounting bolts adapted to removably attach a rim of a spare tire to at least one of the distal half of the vertical member and the horizontal member, the plurality of mounting bolts further adapted to allow the spare tire to be adjustably tightened down against the carrier;
    a plurality of vibration reduction bumpers attached to at least one of the distal half of the vertical member and the horizontal member and adapted to compress as the spare tire is adjustably tightened down against the carrier in order to further secure the spare tire to the carrier via a friction fit;
    a draw bar attached to a first bottom portion of the first hinge bracket and also attached to a second bottom portion of the second hinge bracket, the draw bar extending generally perpendicular to the first and second hinge brackets and in a rearwards direction, the draw bar being configured to fit within a receiver hitch on a vehicle and attach securely therein;
    a secondary receiver hitch attached to the draw bar and extending generally parallel with the draw bar and perpendicular to the hinge brackets in a frontwards direction, the secondary receiver hitch having a mouth at a distal end, the mouth configured to receive a second draw bar therein;
    a hitch pin hole running through the secondary receiver hitch and adapted to accept a hitch pin through the hitch pin hole in order to secure any draw bar inserted within the secondary receiver hitch mouth; and a release pin adapted to hold the vertical member in an upright position between the first and second hinge brackets until the release pin is actuated, thereby releasing the distal half of the vertical member and causing the vertical member to be able to hinge about the hinge bolt, thereby allowing the vertical member to swing downwards from a vertical position so that any spare tire attached thereto is placed at a lower height.

2. The heavy duty leveraged spare tire carrier of claim 1, further comprising:

a leverage handle configured to removably attach to a leverage attachment point on the carrier, the leverage attachment point configured to accept removable attachment of the leverage handle thereto, the leverage handle adapted to decrease a lifting force required to raise the spare tire from the lower height and place the vertical member back in its upright position.

3. The heavy duty leveraged spare tire carrier of claim 1, further comprising:

a security pin configured to secure the release pin in place and ensure that the release pin can only be actuated once the security pin has been removed therefrom.

4. The heavy duty leveraged spare tire carrier of claim 2, further comprising:

a security pin configured to secure the release pin in place and ensure that the release pin can only be actuated once the security pin has been removed therefrom.

5. The heavy duty leveraged spare tire carrier of claim 1, further comprising:

the plurality of mounting bolts including a first mounting bolt attached to the distal half of the vertical member and located above the juncture; and the plurality of mounting bolts including a second mounting bolt attached to the vertical member and located below the juncture.

6. The heavy duty leveraged spare tire carrier of claim 2, further comprising:

the plurality of mounting bolts including a first mounting bolt attached to the distal half of the vertical member and located above the juncture; and the plurality of mounting bolts including a second mounting bolt attached to the vertical member and located below the juncture.

7. The heavy duty leveraged spare tire carrier of claim 3, further comprising:

the plurality of mounting bolts including a first mounting bolt attached to the distal half of the vertical member and located above the juncture; and the plurality of mounting bolts including a second mounting bolt attached to the vertical member and located below the juncture.

8. The heavy duty leveraged spare tire carrier of claim 4, further comprising:

the plurality of mounting bolts including a first mounting bolt attached to the distal half of the vertical member and located above the juncture; and the plurality of mounting bolts including a second mounting bolt attached to the vertical member and located below the juncture.

9. The heavy duty leveraged spare tire carrier of claim 5, wherein the second mounting bolt is slidably engaged in a first mounting slot such that the second mounting bolt is repositionable vertically.

10. The heavy duty leveraged spare tire carrier of claim 6, wherein the second mounting bolt is slidably engaged in a first mounting slot such that the second mounting bolt is repositionable vertically.

11. The heavy duty leveraged spare tire carrier of claim 7, wherein the second mounting bolt is slidably engaged in a first mounting slot such that the second mounting bolt is repositionable vertically.

12. The heavy duty leveraged spare tire carrier of claim 8, wherein the second mounting bolt is slidably engaged in a first mounting slot such that the second mounting bolt is repositionable vertically.

13. The heavy duty leveraged spare tire carrier of claim 1 wherein the plurality of mounting bolts includes a first mounting bolt attached to the horizontal member and a second mounting bolt attached to the horizontal member.

14. The heavy duty leveraged spare tire carrier of claim 2 wherein the plurality of mounting bolts includes a first mounting bolt attached to the horizontal member and a second mounting bolt attached to the horizontal member.

15. The heavy duty leveraged spare tire carrier of claim 3 wherein the plurality of mounting bolts includes a first mounting bolt attached to the horizontal member and a second mounting bolt attached to the horizontal member.

16. The heavy duty leveraged spare tire carrier of claim 4 wherein the plurality of mounting bolts includes a first mounting bolt attached to the horizontal member and a second mounting bolt attached to the horizontal member.

17. The heavy duty leveraged spare tire carrier of claim 13 wherein the second mounting bolt is slidably engaged in a first mounting slot such that the second mounting bolt is repositionable horizontally.

18. The heavy duty leveraged spare tire carrier of claim 14 wherein the second mounting bolt is slidably engaged in a first mounting slot such that the second mounting bolt is repositionable horizontally.

19. The heavy duty leveraged spare tire carrier of claim 15 wherein the second mounting bolt is slidably engaged in a first mounting slot such that the second mounting bolt is repositionable horizontally.

20. The heavy duty leveraged spare tire carrier of claim 16 wherein the second mounting bolt is slidably engaged in a first mounting slot such that the second mounting bolt is repositionable horizontally.

\* \* \* \* \*